United States Patent [19]
Wilson et al.

[11] Patent Number: 5,209,430
[45] Date of Patent: May 11, 1993

[54] HELICOPTER LOW-SPEED YAW CONTROL

[75] Inventors: John C. Wilson, Newport News, Va.; Cynthia A. Crowell, APO AE, N.Y.; Henry L. Kelley, Newport News, Va.

[73] Assignee: The United States of America as represented by the Administrator of the National Aeronautics and Space Administration, Washington, D.C.

[21] Appl. No.: 788,908

[22] Filed: Nov. 7, 1991

[51] Int. Cl.$^5$ ............................................. B64C 27/00
[52] U.S. Cl. ............................. 244/17.19; 244/17.11; 244/75 R
[58] Field of Search ............ 244/17.19, 17.11, 91, 244/130, 199, 75 R; 239/265.19

[56] References Cited

U.S. PATENT DOCUMENTS

| | | | |
|---|---|---|---|
| 2,383,038 | 8/1945 | Bossi | 244/17.19 X |
| 3,059,877 | 10/1962 | Lee | 244/17.19 |
| 3,807,662 | 4/1974 | Velazquez | 244/17.19 |
| 4,200,252 | 4/1980 | Logan et al. | 244/17.19 |
| 4,227,665 | 10/1980 | Carlson et al. | 244/17.11 X |
| 4,708,305 | 11/1987 | Kelley et al. | 244/17.19 |
| 4,786,009 | 11/1988 | Rao et al. | 244/75 R |
| 4,809,930 | 3/1989 | Ballero | 244/17.19 X |
| 4,948,068 | 8/1990 | Van Horn | 244/17.19 |

Primary Examiner—Sherman Basinger
Assistant Examiner—Christopher P. Ellis
Attorney, Agent, or Firm—Kimberlyann C. Bowmer

[57] ABSTRACT

A system for improving yaw control at low speeds consists of one strake placed on the upper portion of the fuselage facing the retreating rotor blade and another strake placed on the lower portion of the fuselage facing the advancing rotor blade. These strakes spoil the airflow on the helicopter tail boom during hover, low speed flight and right or left sidewards flight so that less side thrust is required from the tail rotor.

12 Claims, 3 Drawing Sheets

HELICOPTER LOW-SPEED YAW CONTROL

ORIGIN OF THE INVENTION

The invention described herein was made by an employee of the United States Government and may be manufactured and used by or for the Government for governmental purposes without the payment of any royalties thereon or therefor.

TECHNICAL FIELD OF THE INVENTION

The present invention relates in general to controlling helicopter flight and more specifically to controlling yaw during low-speed flight.

BACKGROUND OF THE INVENTION

During hover and low-speed flight, helicopters experience significant aerodynamic forces on the tail boom caused by the wake from the main and tail rotors and by crosswinds. A helicopter is subjected to complex airflows that are self-imposed as a result of the main and tail rotor wakes and as a result of ambient wind. These airflows produce aerodynamic forces on the fuselage and tail boom assembly during hover and low speed sideward flight. When operating in this portion of the flight envelope, the airflow from the main rotor wake has a large impact on the tail boom forces. These effects cause the tail boom to be subjected to air loads which must be counteracted by main rotor and tail rotor thrust to maintain aircraft trim. These increased power requirements result in a reduction in payload and yaw control margin.

In order to provide sufficient torque control and adequate sideslip ability, most prior helicopter designs have employed a combination of tail fin and a relatively large, power consuming, tail rotor. The problems associated with the use of this type tail rotor are well documented in the prior art. The foremost problem is the hazard presented by the tail rotor, particularly to ground personnel. Additionally, in military helicopters, the tail rotor is vulnerable to combat damage which can result in catastrophic loss of control of the helicopter. Also, the reliability and maintainability problems of a tail rotor, with its gearboxes, bearings, and drive shafts, are severe. Further, during high speed flight the tail rotor requirement can be reduced, since yaw control can be provided by aerodynamic surfaces. However, the typical tail rotor continues to use excessive engine power and to produce adverse drag effects.

In order to avoid these problems, efforts have been made to eliminate tail rotors. In U.S. Pat. No. 4,200,252 (Logan) and earlier referenced patents, helicopter antitorque systems are disclosed which employ the principles of fuselage circulation control using the main rotor downwash. These inventions describe how exhaust or other engine-driven air may be ducted into the helicopter aft fuselage section and then be injected tangential to the fuselage in order to induce more circulation. This increase in circulation is achieved by use of main rotor downwash to produce additional lateral forces on the fuselage which oppose main rotor torque.

However, it is established in prior art that main rotor downwash does not flow over the fuselage during high speed flight. The forward velocity of the helicopter moves the fuselage clear before the wash can reach it. Viewed from within the helicopter, the downwash pattern appears to have a large rearward horizontal component. Thus, a supplemental means of directional control, other than circulation control alone, is necessary. These supplemental means include tail rotors, aerodynamic fins, and reaction jets.

Two U.S. patents specifically address circulation control, Logan supra and U.S. Pat. No. 3,807,662. Both of these patents contemplate increasing the favorable lateral forces on the helicopter fuselage. These types of devices result in increased complexity and weight. The ducting, plenum and nozzle arrangements require considerable redesign and modification of the helicopter. Further, the possibility of mechanical failure and the increased vulnerability in the case of a military helicopter remain inherent deficiencies.

U.S. Pat. No. 4,708,305 partially solves the low-speed yaw control problem by placing two strakes on the side of the fuselage facing the approaching main rotor blade. This arrangement results in a significant download on the tail boom and is only beneficial in reducing side thrust and yaw control in right sideward flight.

Accordingly, it is an object of the present invention to provide upper and lower fuselage strakes located on opposite sides of the helicopter fuselage which will beneficially alter the air flow around the helicopter tail boom.

It is another object of this invention to improve left and right sideward flight.

It is another object of this invention to reduce the load requirements on the helicopter torque control means.

It is another object of this invention to reduce the size of the helicopter torque control means by using fuselage air loads to provide part of the needed torque control.

A further object of the invention is to increase helicopter sideslip ability by controlling air flow circulation around the fuselage.

Another object of the invention is to provide a retraction/extension mechanism whereby the strakes may be positioned for optimal performance.

A further object of the invention is to provide improved reliability and maintainability for the helicopter torque control means by reducing power and load requirements.

Still another object of the present invention is to improve helicopter performance through increased cross wind speed in hover, increased fuel savings and increased load capacity by decreasing power required from the torque control, by decreasing drag inherent in the torque control and by reducing weight of the torque control means.

Additional objects and advantages of the present invention are apparent from the drawings and specification which follow.

SUMMARY OF THE INVENTION

According to the present invention, the foregoing and additional objects are obtained by providing a helicopter yaw control system for use on a helicopter having a fuselage which extends rearward through the downwash of the main rotor. Yaw control is provided by a combination of two strake devices in which the upper strake is located above the lower strake and along the side of said fuselage which faces the retreating rotor blade and the lower strake is located along the side of the fuselage which faces the advancing rotor blade. There is also a supplemental control means to assist in controlling main rotor torque which may be a tail rotor, a tail boom with circulation control and/or a supplemental tail thruster, or a fan-in-fin type anti-torque system. The upper strake may extend further from the fuselage than the lower strake does. If the helicopter is constructed with a tail rotor shaft cover located along the top of the fuselage, the upper strake may be located on the tail rotor shaft cover. To provide greater yaw control, the upper and lower strakes may be retractable.

DETAILED DESCRIPTION OF THE INVENTION

Figure 1:
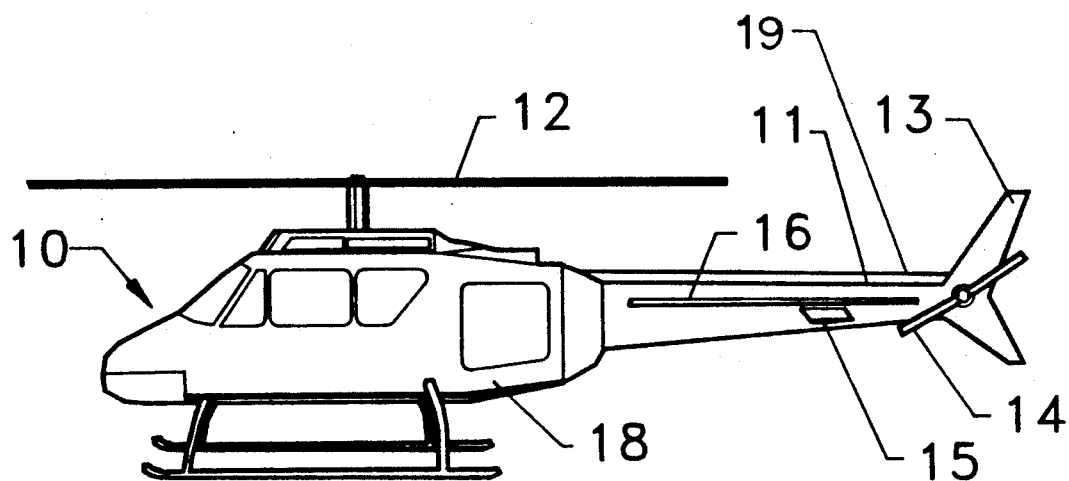
FIG. 1 is a perspective view of a helicopter having a strake attached to the upper portion of the fuselage.
Figure 2:
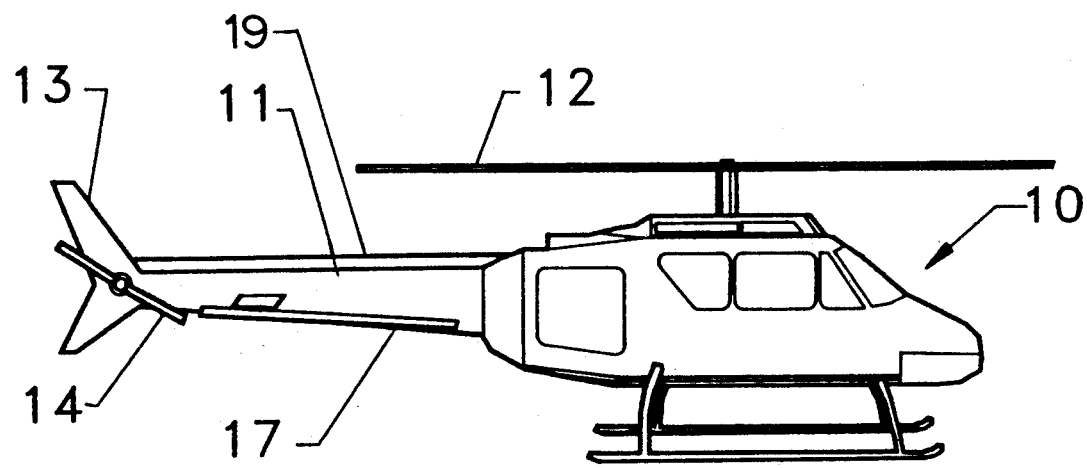
FIG. 2 is a perspective view of a helicopter having a strake attached to the lower portion of the fuselage.

FIGS. 1 and 2 show a representative helicopter designated generally by the reference numeral 10 comprising a cabin fuselage section 18 and the boom or aft fuselage section 11 with a main rotor 12. Attached to the aft fuselage is the upper and lower vertical fin 13, and a torque control means 14 in this embodiment shown as a tail rotor. A horizontal stabilizer 15 may be part of the design or may be absent. The helicopter may be constructed with a tail rotor shaft cover 19 located along the top of the aft fuselage section 11. The present invention is the combination of two strakes 16 and 17 shown in a representative configuration.

Figure 3:
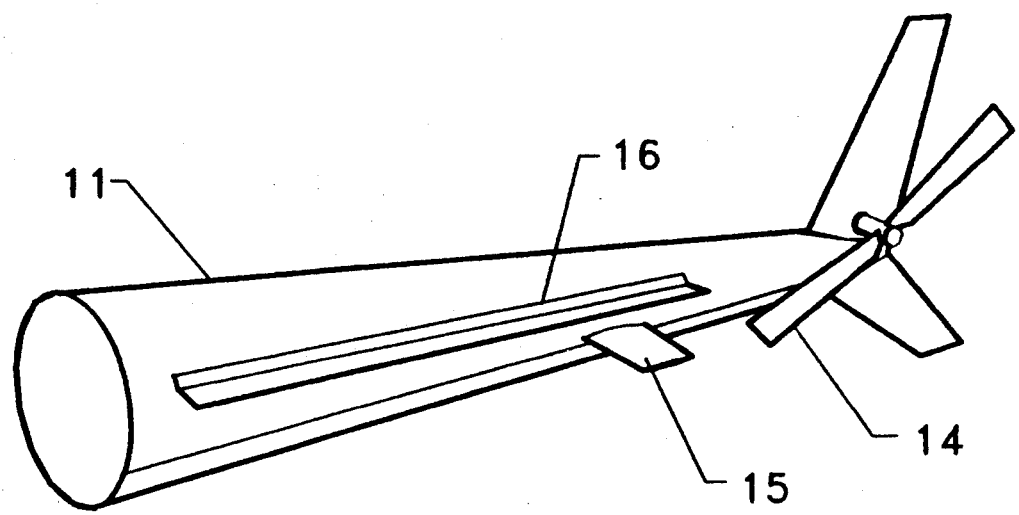
FIG. 3 is a perspective view of the fuselage.
Figure 4:
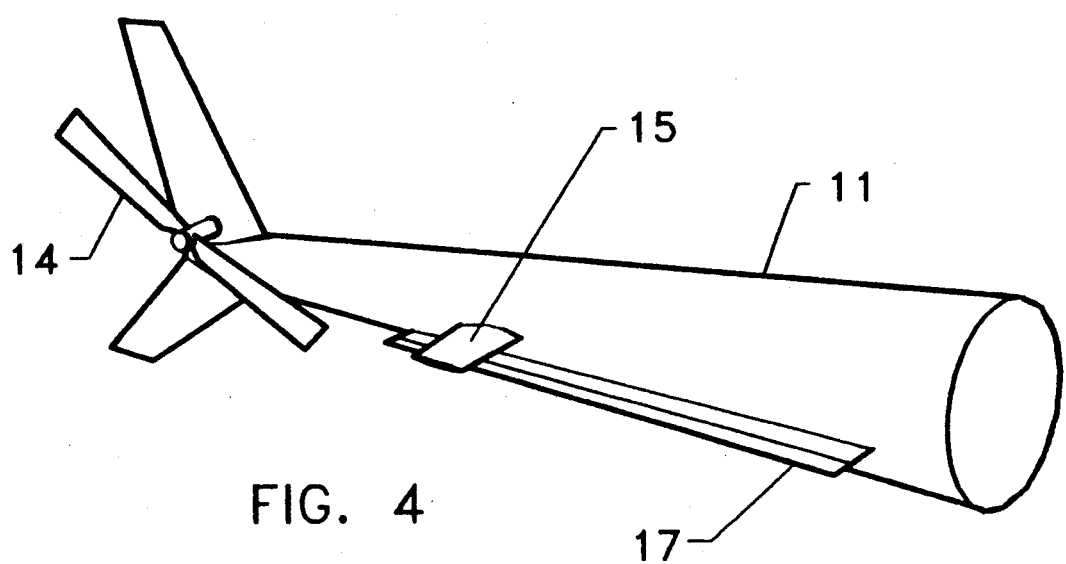
FIG. 4 is a perspective view of the fuselage.
Figure 5:
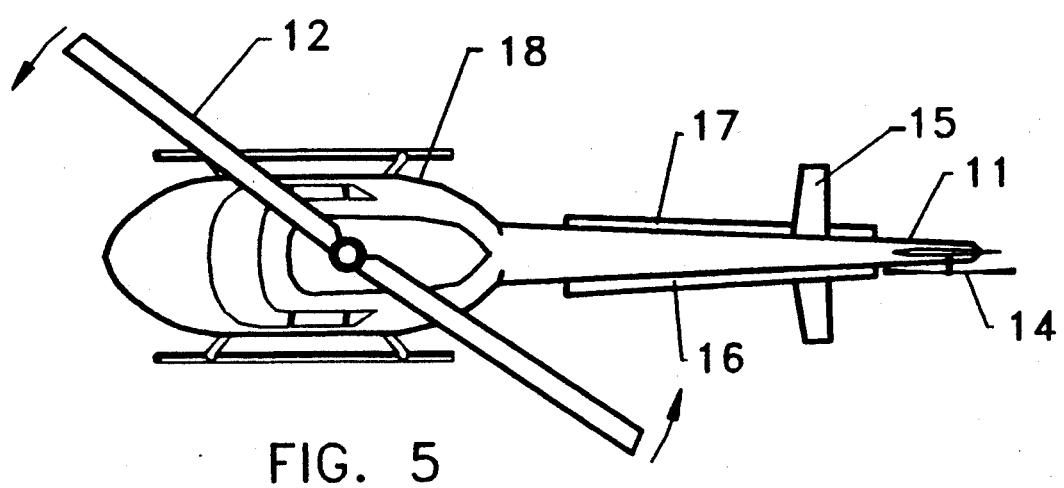
FIG. 5 is a top view of the helicopter showing the location of the strakes.

The upper strake 16 is angularly displaced approximately 270° to 360° from top dead center (TDC) 21 (see FIGS. 3 and 4) of the fuselage and faces the retreating main rotor blade 12. If there is a tail rotor shaft cover 19 on the aft fuselage section 11, upper strake 16 may be attached directly to the tail rotor shaft cover 19. The lower strake 17 is angularly displaced approximately 90° to 180° from TDC 21 and faces the advancing main rotor blade 12. The upper strake 16 is about two inches wide and the lower strake 17 is about one inch wide.

Figure 6:
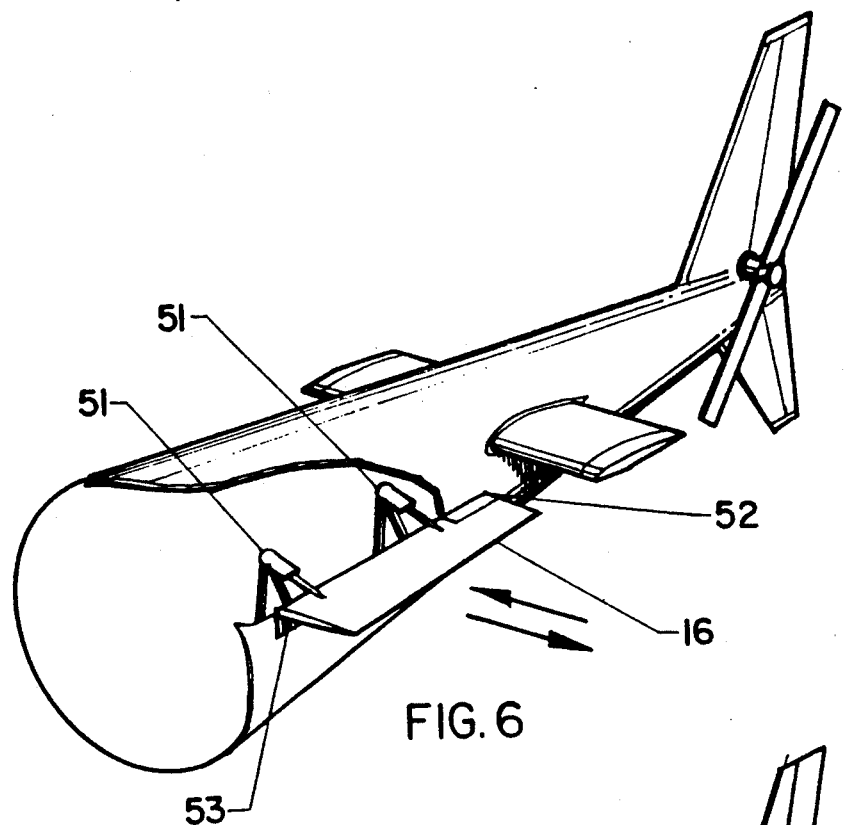
FIG. 6 is a perspective view of one of the fuselage strakes showing the attachment of actuators.

FIG. 6 shows an alternative embodiment in which the strakes are retractable by use of actuators 51. Slots 52 and 53 are sealed by a rubber flap or other suitable means when the strakes are retracted.

Figure 7:
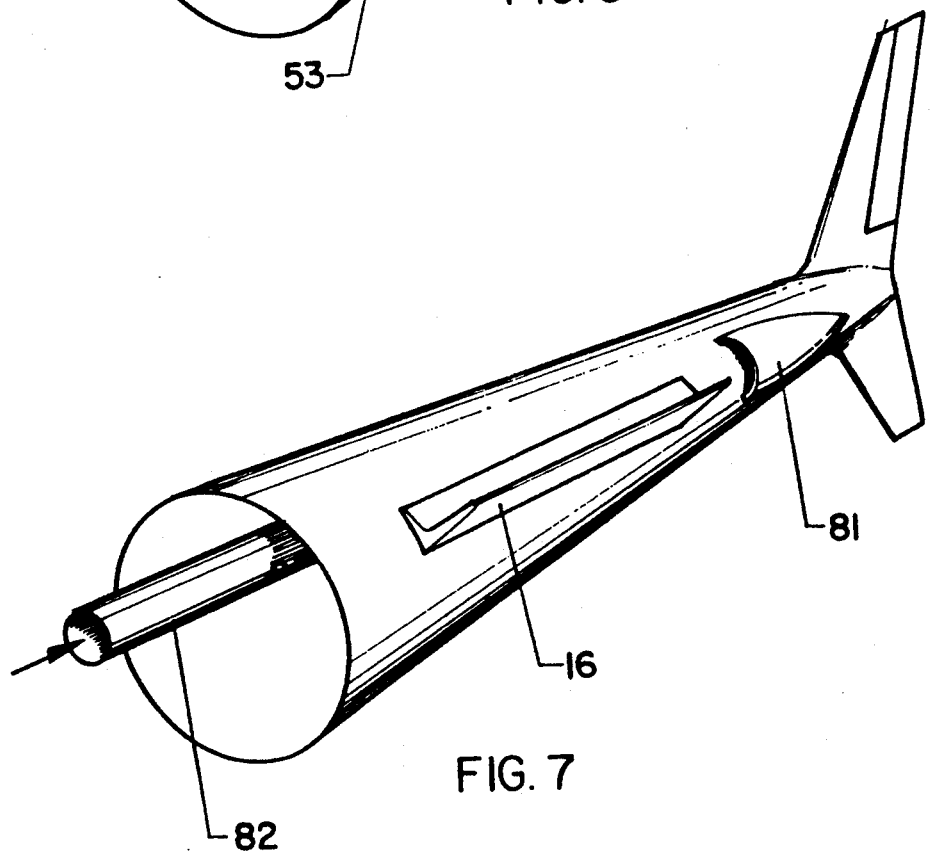
FIG. 7 shows an alternate torque control means using a lateralthrusting jet in conjunction with the present invention to achieve the necessary torque control.

FIG. 7 shows an alternative torque control means which uses ducted air jets 81 powered by pressurized air 82 as a replacement for the tail rotor 14. This jet would require less power, and would be lighter when used in combination with the present invention, than designs of the prior art.

What is claimed is:

1. A helicopter yaw control system comprising:
   a helicopter;
   said helicopter having a main rotor attached thereto;
   said helicopter having a fuselage extending rearward through rotor downwash;
   helicopter yaw control means consisting of a combination of exactly two strake devices arranged asymmetrically about the fuselage, the combination including an upper strake being located above a lower strake, the upper strake being located along the side of the fuselage which faces the retreating rotor blade and the lower strake being located along the side of the fuselage which faces the advancing rotor blade; and
   supplemental control means to assist in controlling main rotor torque.

2. The helicopter yaw control system of claim 1 wherein the upper strake is located in the upper half of the side of the fuselage which faces the retreating rotor blade.

3. The helicopter yaw control system of claim 1 wherein the lower strake is located in the lower half of the side of the fuselage which faces the advancing rotor blade.

4. The helicopter yaw control system of claim 1 wherein the supplemental torque control means is a tail rotor.

5. The helicopter yaw control system of claim 1 wherein the supplemental torque control means is a circulation control tail boom.

6. The helicopter yaw control system of claim 1 wherein the supplemental torque control means is a supplemental tail thruster.

7. The helicopter yaw control system of claim 1 wherein the supplemental torque control means is a circulation control tail boom in combination with a supplemental tail thruster.

8. The helicopter yaw control system of claim 1 wherein the supplemental torque control means is a fan-in-fin anti-torque system.

9. The helicopter yaw control system of claim 1 wherein the upper strake extends further from the fuselage than the lower strakes does.

10. The helicopter yaw control system of claim 1 wherein the helicopter has a drive shaft cover over the fuselage.

11. The helicopter yaw control system of claim 10 wherein the upper strake is located on the tail rotor shaft cover.

12. The helicopter yaw control system of claim 1 wherein the upper and lower strakes are retractable.

* * * * *